United States Patent [19]

Keiswetter

[11] Patent Number: 4,884,839
[45] Date of Patent: * Dec. 5, 1989

[54] CO-EXTRUDED TEMPORARY SEAT COVER FOR NEW VEHICLES

[76] Inventor: Paul C. Keiswetter, 431 Michigan Ave., Charlevoix, Mich. 49720

[*] Notice: The portion of the term of this patent subsequent to Jun. 30, 2004 has been disclaimed.

[21] Appl. No.: 20,026

[22] Filed: Mar. 2, 1987

Related U.S. Application Data

[63] Continuation-in-part of Ser. No. 784,817, Oct. 4, 1986, Pat. No. 4,676,376.

[51] Int. Cl.⁴ .................. A47C 31/00; B65D 65/02; B32B 7/02
[52] U.S. Cl. ............................... 297/219; 150/154; 206/494; 297/229; 428/212
[58] Field of Search ................ 297/219, 220, 221, 224, 297/229, 225, 218, 223, DIG. 1; 150/52 R, 52 K; 206/494, 449; 428/212; 156/243

[56] References Cited

U.S. PATENT DOCUMENTS

| | | | |
|---|---|---|---|
| 3,695,692 | 10/1972 | Williams | 297/229 |
| 3,827,752 | 8/1974 | Bissinger, Sr. | 297/219 X |
| 4,266,663 | 5/1981 | Geraci | 150/52 R X |
| 4,319,781 | 3/1982 | Tsuge | 297/219 X |
| 4,389,450 | 6/1983 | Schaefer et al. | 428/212 |
| 4,518,654 | 5/1985 | Eichbauer et al. | 428/331 |
| 4,560,598 | 12/1985 | Cowan | 428/35 |
| 4,565,720 | 1/1986 | Yaeo et al. | 428/35 |
| 4,643,928 | 2/1987 | Kimura wet al. | 428/36 |
| 4,676,376 | 6/1987 | Keiswetter | 206/494 |

FOREIGN PATENT DOCUMENTS

| | | | |
|---|---|---|---|
| 796209 | 10/1968 | Canada | 297/229 |
| 851553 | 9/1970 | United Kingdom | 206/554 |

*Primary Examiner*—Bryon P. Gehman
*Attorney, Agent, or Firm*—Waters, Morse & Harrington

[57] ABSTRACT

A temporary vehicle seat cover is adapted for installation after the manufacture of the seat, and before it is mounted in the vehicle, to protect the seat upholstery until the vehicle reaches the purchaser. It is then easily removed without leaving fragments of the seat cover entrapped between the seat and its support structure.

10 Claims, 1 Drawing Sheet

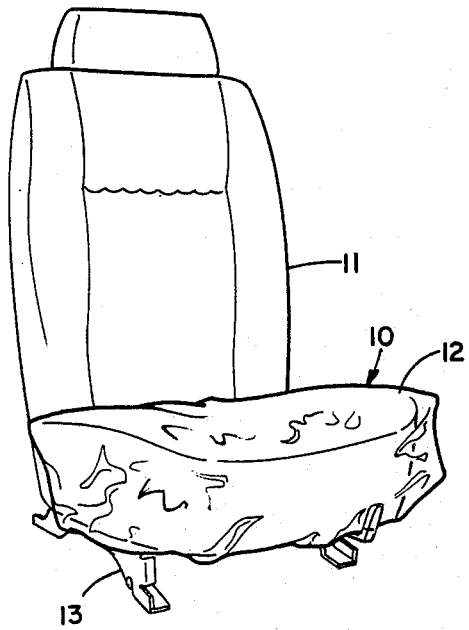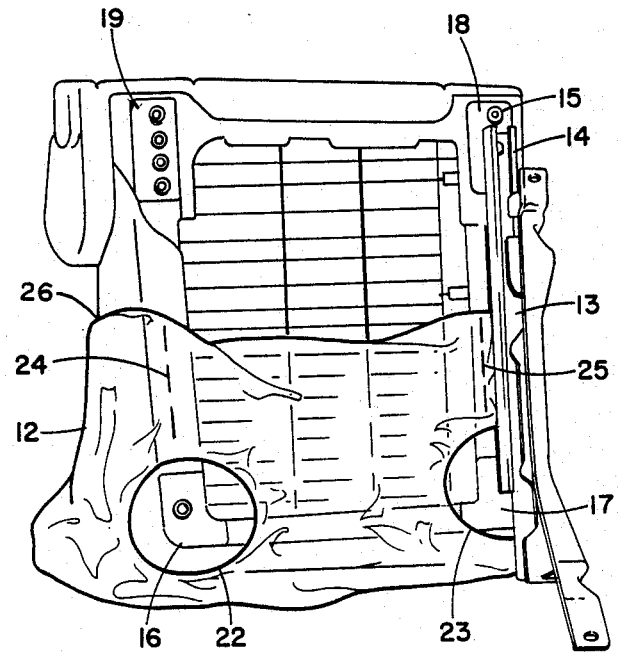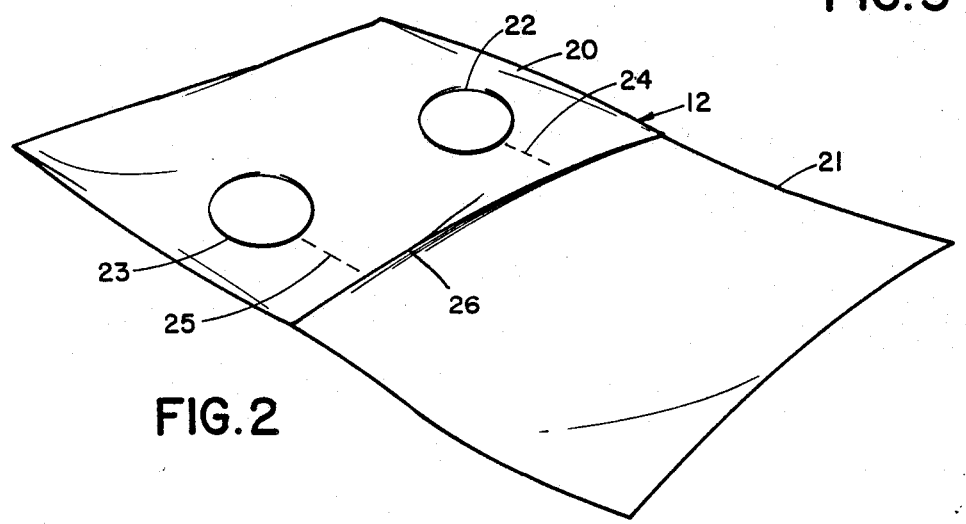

CO-EXTRUDED TEMPORARY SEAT COVER FOR NEW VEHICLES

CROSS REFERENCE TO RELATED APPLICATION

This application is a continuation-in-part of applicant's co-pending application, Ser. No. 784, 817, filed Oct. 4, 1986, now Pat. No. 4676376, issued June 30, 1987.

BACKGROUND OF THE INVENTION

Temporary seat covers are commonly used to protect the upholstery of vehicle seats from soil. In sales showrooms, the vehicles are subject to countless trial "sittings" by prospective purchasers and sales personnel. As a matter of psychology, it gives the new owner of a vehicle considerable satisfaction to be able to peel off a protective cover, and know that he is the first user of the upholstery.

Some seat covers are designed to be slipped on by mechanics that may be contacting the seat during service operations. A cover of this type is shown and claimed in my U.S. Pat. No. 4,676,376, issued June 30, 1987. That cover is made of a plastic material having a greater coefficient of friction on the inside than on the outside, so that it will stay in place on the seat, and yet permit the occupant to slide freely over it. These covers are commonly transparent, permitting the appearance of the upholstery to remain visible.

There are a number of advantages to installing a protective cover over a seat as soon as the seat is manufactured, and before it is mounted on the support structure in the vehicle. The seat is then protected while it is still an inventory item, and subject to the usual handling in storage and shipment. The installation of such a seat cover after the mounting of the seat in the vehicle is complicated by the presence of the support structure for the seat. To remain securely in place and effectively protect the sides and front of the seat, the cover should embrace a considerable portion of the seat. This is obstructed by the structure on which the seat rests. When the cover is slipped over the seat before the seat is mounted, portions of the embracing cover become entrapped between the seat and its supporting surfaces, making it difficult to remove the cover later without leaving unsightly fragments of the cover material protruding.

SUMMARY OF THE INVENTION

The seat cover provided by this invention has a portion embracing the seat, and the underside of this portion has openings adapted to surround the areas where the seat frame bears on its support structure. Preferably, tear perforations extend from these openings to an adjacent edge of the cover material. Tearing along these lines thus frees the cover for removal.

DESCRIPTION OF THE DRAWINGS

FIG. 1 is a perspective view showing a vehicle seat with a temporary seat cover fully installed.

FIG. 2 is a perspective view of the underside of a seat cover, prior to installation.

FIG. 3 is a perspective view showing the underside of a seat, with the cover partially installed. One of the support rails is shown bolted to the seat frame over the seat cover. FIG. 4 is a cross-section of the seat cover material.

DESCRIPTION OF THE PREFERRED EMBODIMENT

A conventional vehicle seat is generally indicated at 10, in association with a back 11. A temporary seat cover 12 has been partially installed. The conventional support structure for the seat is indicated generally at 13, and includes side rails 14 bolted to the seat frame 15. Portions of the seat frame indicated at 16-19 are in bearing engagement with the rails. These frame portions form isolated islands, with the rails bridging across the space between them.

The configuration of the seat cover is adapted to accommodate this conventional structural system. Referring to FIG. 2, the seat cover has a bag portion 20 adapted to embrace the frontal portion of the seat. The remainder of the seat cover is a tail 21 that extends back over the top of the seat, and is normally tucked between the seat and the lower portion of the back.

Referring to FIG. 3, the underside of the bag portion 20 has a pair of large holes 22 and 23 that surround the areas where the rails 14 bear on the two front frame portions 16-17 to which they are bolted. Lines of tear perforations are shown at 24 and 25 extending from these holes to the adjacent edge 26 of the seat cover, permitting the cover to be torn along these lines and then removed easily without the entrapment of any of the cover material between the rails and the seat frame. Preferably, the bag portion 20 does not extend far enough to the rear to require another pair of holes surrounding the rear bolted connections.

It is recommended that the seat cover be made of a material which is transparent, and has a higher coefficient of friction on the inside than on the outside. As shown in FIG. 4, the inside 28 is preferably a linear low-density polyethylene, and the outside surface 30 is a high-density polyethylene. This material and its desired properties are described in more detail in my Pat. No. 4,676,376. Using these materials, the coefficient of friction on the inside can be in the range of 0.3 to 0.7 and preferably 0.5 to 0.7. The outside coefficient of friction is about 0.25 and preferably about 0.2 or less. The differential between the coefficients should be at least 0.1

The embodiments of the invention in which an exclusive property of privilege is claimed are defined as follows:

1. An easily removable temporary plastic seat cover for protecting a new automobile-type vehicle seat having seating and backrest portions, wherein a frame on the underside of the seat is first covered with the seat cover and subsequently secured to a support means in bearing engagement with at least one portion thereof, the seat cover comprising a bag that fits over the front of the seat and extends over the top of the seat and under the frame, the seat cover including at least one opening in the underside thereof that surrounds the portion of the frame that is in bearing engagement with the support means, such that the seat cover is not pinched between the seat frame and support means when they are secured together, the seat cover being tearable to remove the seat cover from the seat, the opening permitting removal of the entire seat cover, without a portion of the seat cover being retained in the area of bearing engagement between the seat frame and the support means, the seat cover being formed of a co-extruded plastic material wherein inside and outside surface layers are formed of two different plastic materials having different coefficients of friction, the ouside surface being relatively slippery compared with the inside surface, the outside surface layer being formed of high-density polyethylene and inside surface layer being formed of linear low-density polyethylene.

2. A temporary plastic seat cover according to claim 1 wherein the coefficient of friction of the inside surface is about 0.3 or greater and the coefficient of friction of the outside surface is 0.25 or less, and the differences between the coefficients of friction are at least 0.1.

3. A temporary plastic seat cover according to claim 1 wherein the coefficient of friction of the inside surface is about 0.5 to 0.7 and the coefficient of friction of the outside surface is about 0.2 or less.

4. A temporary plastic seat cover for protecting an automobile-type vehicle seat having seating and backrest portions, the seat cover fitting over the seat so as to at least cover the seating portion of the seat, the seat cover being formed of a co-extruded plastic material wherein inside and outside surface layers are formed of two different plastic materials having different coefficients of friction, the outside surface layer being relatively slippery compared with the inside surface layer, the outside surface layer comprising high-density polyethylene.

5. A temporary plastic seat cover according to claim 4, wherein the coefficient of friction of the inside surface is about 0.3 or greater and the coefficient of friction of the outside surface is 0.25 or less, and the difference between the coefficients of friction of the two layers is at least 0.1.

6. A temporary plastic seat cover according to claim 4 wherein the coefficient of friction of the inside surface layer is about 0.5 to 0.7 and the coefficient of friction of the outside surface layer is about 0.2 or less.

7. A temporary plastic seat cover according to claim 4 wherein the inside surface layer comprises low density polyethylene.

8. A temporary plastic seat cover according to claim 7 wherein the inside surface layer comprises linear low density polyethylene.

9. A temporary plastic seat cover according to claim 4 wherein the seat is fastened to a support on the floor of the vehicle and the seat bears on the support at the point of attachment but is spaced apart from the support at other portions of the seat, the seat cover fitting over a front edge of the seat prior to installation in the vehicle and extending over upper and lower sides of the seating portion, the seat cover having at least one opening therein that surrounds the area where the seat contacts the support, such that the seat cover is not pinched between the support and the seat, the seat cover being manually tearable for easy removal of the seat cover without leaving parts of the seat cover between the support and seat.

10. A temporary plastic set cover according to claim 9 wherein the seat cover has a line of weakened tensile strength extending from an edge of the seat cover to the opening so as to facilitate tearing of the seat cover to remove it from the seat.

* * * * *

UNITED STATES PATENT AND TRADEMARK OFFICE
CERTIFICATE OF CORRECTION

PATENT NO.   : 4,884,839
DATED        : December 05, 1989
INVENTOR(S)  : Paul C. Keiswetter It is certified that error appears in the above-identified patent and that said Letters Patent is hereby corrected as shown below:

In the Specification:

Col. 2, line 40, after "4,676,376." insert the following sentence --The material desirably is formed by co-extrusion of the plastic resins.--

Signed and Sealed this

Twenty-ninth Day of January, 1991

Attest:

HARRY F. MANBECK, JR.

*Attesting Officer*          *Commissioner of Patents and Trademarks*